B. W. HEAD.
APPARATUS FOR CHARGING OPEN HEARTH FURNACES.
APPLICATION FILED NOV. 10, 1908.
913,658.
Patented Feb. 23, 1909.
2 SHEETS—SHEET 1.
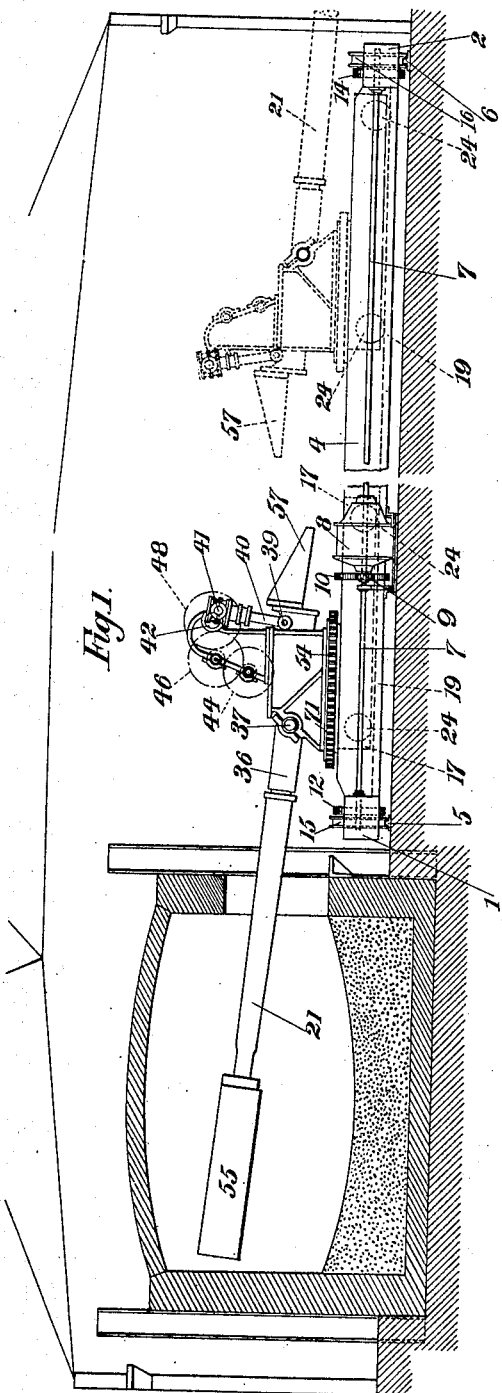
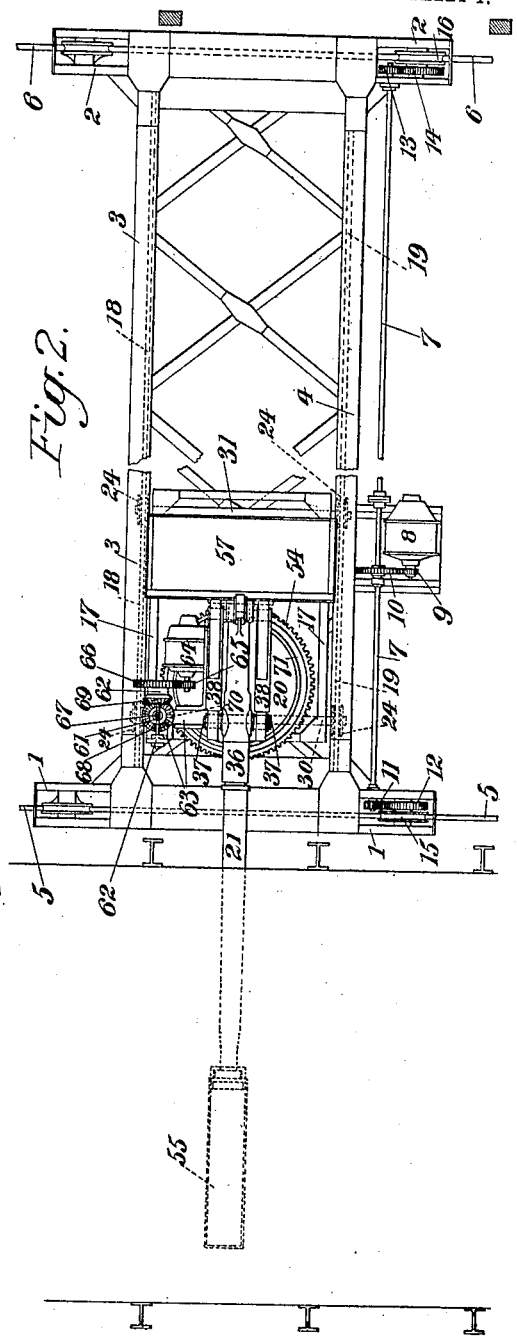

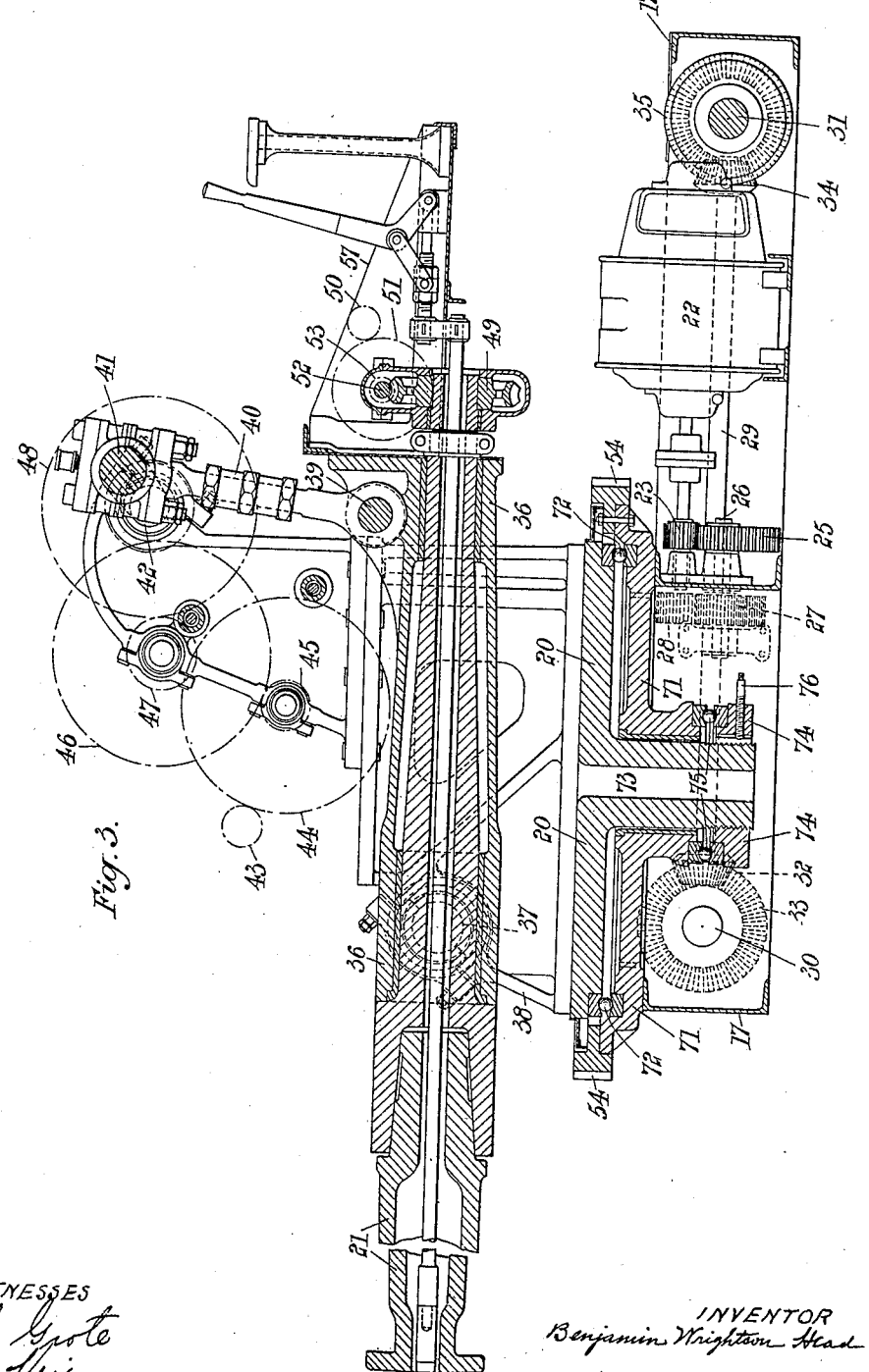

UNITED STATES PATENT OFFICE.

BENJAMIN WRIGHTSON HEAD, OF WESTMINSTER, LONDON, ENGLAND.

APPARATUS FOR CHARGING OPEN-HEARTH FURNACES.

No. 913,658.     Specification of Letters Patent.     Patented Feb. 23, 1909.

Application filed November 10, 1908. Serial No. 461,941.

To all whom it may concern:

Be it known that I, BENJAMIN WRIGHTSON HEAD, a subject of the King of Great Britain and Ireland, of 47 Victoria street, in the city of Westminster and county of London, England, M. A. Cantab., A. M. I. C. E. and managing director of Wellman-Seaver and Head Limited, have invented new and useful Improvements in Apparatus for Charging Open-Hearth Furnaces and the Like, of which the following is a specification.

My invention relates to machines for charging open-hearth furnaces and the like, which machines are of the kind which have a charging arm provided with means by which the charge can be taken up and then the arm be partly rotated and manipulated to introduce the charge into the furnace, the object of my invention being to provide a convenient and compact construction such that the machine is supported by, and adapted to be operated on, girders, or other suitable supports, on the ground level, or the level of the base of the furnaces, and the charging arm is at a low level to suit the openings of open-hearth, and other, furnaces, which are low down, and so that it can be turned round clear of any obstruction.

The accompanying drawings represent apparatus according to my invention, Figure 1 being a side elevation, and Fig. 2 a plan, and Fig. 3 a section of the trolley carrying the charging arm.

I will presume that the charging arm is mounted and operated so as to tilt upon a center, although, if desired, it can be arranged to be lifted and lowered by a parallel motion.

Girders 1, 2, 3 and 4, or equivalent supports, are connected to form a structure provided with wheels 15 and 16 to run on rails 5 and 6 in front of the furnaces. The said structure may be caused to travel on the said rails 5 and 6 by any suitable means, but preferably by the means illustrated consisting of a shaft 7 rotated by an electric motor 8 through a pinion 9 and spur wheel 10, pinions 11 and 13 on the shaft 7 engaging with spur wheels 12 and 14 on the axles of two of the wheels 15, 16. On the lower flanges of girders forming rails 18 and 19, carried by the structure constituted by the connected girders, or supports, 1, 2, 3 and 4, a trolley 17 is mounted so that the said trolley is capable of running low down on the said rails 18 and 19 in directions towards and away from the furnaces. The said trolley 17 carries a rotatable structure, or platform, 20, which has the charging arm 21 centered low down at 37 in standards 38 thereon, so that the said arm 21 can be tilted on the centers 37, and it can be turned round horizontally by rotative motion of the structure, or platform, 20, on the trolley 17, the mechanism for effecting the tilting, turning, and traversing, movements being also carried by the rotatable structure, or platform, 20, mounted in a central bearing in a casing 71 supported by the trolley 17, ball bearings being provided at 72 for the structure, or platform, 20 to run on. The central boss 73 of the structure, or platform, 71 has a nut 74 screwed onto its lower projecting end, between which nut and the boss of the casting 71 are ball bearings 75, which can be adjusted by screwing up the nut and fixing it by the pin 76. The charging arm 21 may be provided with any usual, or suitable, means for holding the charges, such as grips for ingots, or a device for attaching the end of the said arm to the boxes containing the charges.

The trolley 17 is traversed on the rails 18 and 19 by an electric motor and gear 22 mounted low down in the trolley 17, behind the rotatable structure, or platform, (that is at the rear of the trolley relatively to the furnace), the pinion 23 on the shaft of the said motor engaging with a toothed wheel 25 secured to a shaft 26 which has also secured thereto a pinion 27 engaging with a spur wheel 28 secured to a shaft 29, the motion of which is transmitted to the axle shafts 30 and 31 of the traveling wheels 24 of the trolley 17 by means of the bevel pinions 32 and 34 and bevel wheels 33 and 35.

The charging arm 21 is mounted low down on the structure, or platform, 20 in any suitable manner, and its tilting movements are given to it by mechanism situated above it. As shown, the said tilting arm is mounted in a hollow casing 36, the said hollow casing 36 being provided, at one end, with trunnions mounted in the bearings in the standards 38. The other end of the said casing is connected, at its upper side, by a pin 39 and connecting rod 40, to the crank 41 of a shaft 42 by the partial rotation of which the casing 36 and the charging arm carried thereby are tilted. Motion is given to the said shaft 42 by an electric motor (carried by the rotatable structure, or platform, 20, but not shown in the drawings,) through a spur pinion 43 and transmission gear wheels 44, 45, 46 and 47 to a toothed wheel 48 secured to the shaft 42. For taking up the charge and discharging it in the furnace, the gripping, or holding, device is actuated from the rear end of the tilting arm. The arrangement shown is presumed to be for taking up boxes containing charges and turning the said arm within its casing to discharge the contents into the furnace. The outer end of the said arm 21, which protrudes from the casing 36, has secured to it a worm-wheel 49, which is rotated by an electric motor (carried by the rotatable structure, or platform, 20, but not shown in the drawings,) through a pinion 50 engaging with a toothed wheel 51 secured to a shaft 52, to which is also secured a worm 53 which engages the aforesaid wheel 49.

The structure, or platform, 20 may be rotated by an electric motor through any suitable means. The means illustrated in Fig. 2 consist of a shaft 61, mounted in bearings 62 in a bracket 63, secured to the structure, or platform, 20, and rotated by an electric motor 64 (mounted on the structure, or platform, 20) through a pinion 65 and toothed wheel 66 on the shaft 61, which also carries a bevel pinion 69 gearing with a bevel wheel 68 on a vertical shaft 67, mounted in bearings in the said bracket 63 and having secured to it a pinion 70, which engages with the stationary circular toothed rack 54 secured to the casting 71, so that this pinion 70 runs round the said rack 54, and, as the said vertical shaft 67 is carried by the said structure, or platform, 20, the said structure, or platform, is thereby caused to rotate to the required extent.

In operation, the trolley 17 is brought into the position shown in dotted lines in Fig. 1 and the structure, or platform, 20 carried by it is turned and the arm 21 brought to the position to receive the charge, for example a charge in a box from a truck, and the mechanism is then operated, so that the arm 21 is raised (to facilitate which it is counterweighted at 57), the structure, or platform, 20, with the arm 21 and charge, being slued round and the trolley 17 operated so that the charge is thrust by the said arm 21 into the furnace, as shown in full lines in Fig. 1, and then the charge is released, by partly rotating the arm 21 on its longitudinal axis, so as to tip the contents of the box 55 into the furnace, and thereafter the trolley 17 is run back and the arm withdrawn from the furnace ready to be manipulated to receive another charge.

If ingots, or the like, are being dealt with, the arm will be provided with grips to grasp and release the ingots, or the like.

The apparatus is especially adapted for use in cases where the roof is low and overhead supports are impracticable.

I prefer to employ electric motors and gear for giving the necessary movements to the apparatus and to provide a separate motor and controller for each of the gears giving the respective movements.

Having now particularly described and ascertained the nature of my said invention and in what manner the same is to be performed, I declare that what I claim is:—

In apparatus for charging open-hearth, or other furnaces, the combination with girders, or supports, mounted to run on rails on the ground level, or the level of the base of the furnaces, of a trolley, a motor and gear for moving the said trolley to and from the furnaces on the lower flanges of the said girders, or supports, the said motor and gear being low down in the said trolley and situated behind a rotatable structure, or platform, carried by the said trolley and having a charging arm mounted low down on the said structure, or platform, and devices which operate on the said arm from above it for tilting, or raising and lowering it, substantially as hereinbefore described.

In testimony whereof I have signed my name to this specification in the presence of two subscribing witnesses.

BENJAMIN WRIGHTSON HEAD.

Witnesses:
 H. D. JAMESON,
 F. L. RAND.